F. E. TEN EYCK.
CLUTCH MECHANISM.
APPLICATION FILED AUG. 25, 1913.
1,120,253.
Patented Dec. 8, 1914.
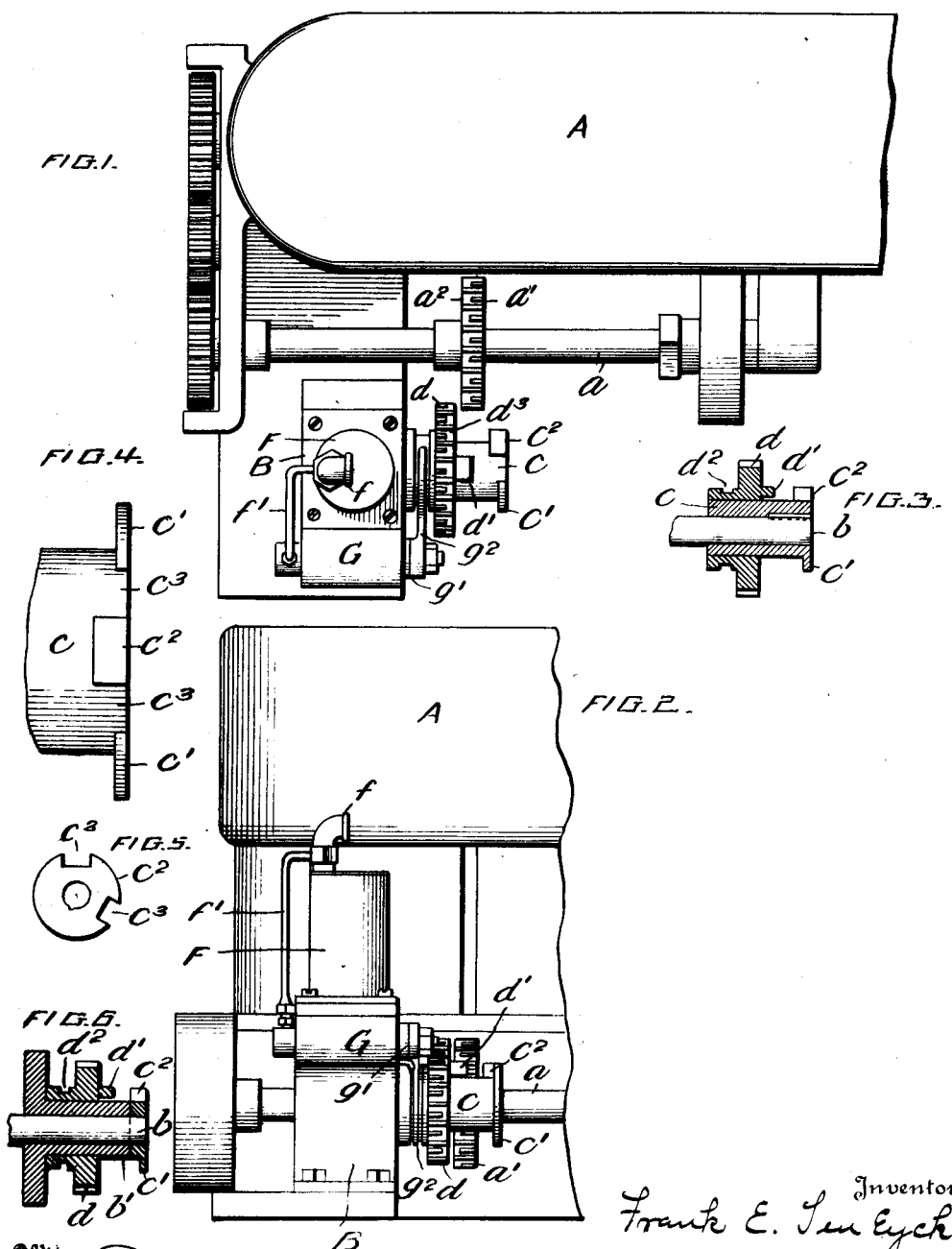

UNITED STATES PATENT OFFICE.

FRANK E. TEN EYCK, OF AUBURN, NEW YORK, ASSIGNOR TO AUTO AIR-ROTAR COMPANY, A CORPORATION OF MAINE.

CLUTCH MECHANISM.

1,120,253.  Specification of Letters Patent.  Patented Dec. 8, 1914.

Original application filed July 30, 1912, Serial No. 712,335. Divided and this application filed August 25, 1913. Serial No. 786,526.

*To all whom it may concern:*

Be it known that I, FRANK E. TEN EYCK, a citizen of the United States, residing at Auburn, in the county of Cayuga and State of New York, have invented certain new and useful Improvements in Clutch Mechanism; and I do hereby declare the following to be a full, clear, and exact description of the invention, such as will enable others skilled in the art to which it appertains to make and use the same.

My invention consists in the novel features herein fully described, reference being had to the accompanying drawings which illustrate an embodiment of my invention selected by me for purposes of illustration and the said invention is fully disclosed in the following description and claims.

My present invention is a division of the subject matter of my former application for United States Letters Patent, filed July 30, 1912, Serial No. 712,335.

In the drawings, Figure 1 represents a top plan view of a portion of the motor of an automobile, and a pump or air compressor driven thereby, my improved clutch mechanism being here shown as operating to connect the motor and the pump shaft when desired. Fig. 2 is a side elevation of the same mechanism. Fig. 3 is a sectional view of my improved clutch mechanism. Fig. 4 is an elevation of one member of the clutch, considerably enlarged. Fig. 5 is an end view of the part illustrated in Fig. 4 but drawn to the scale of the other drawings. Fig. 6 is a sectional view similar to Fig. 3 and illustrating a slightly modified form of the clutch.

In these figures A is the motor and B the pump. $a$ is the motor shaft from which the pump is actuated and $b$ is the pump shaft for actuating the piston of the pump. In the form of clutch mechanism shown in Figs. 1 to 5 inclusive, the shaft $b$ is provided with a sleeve $c$ keyed thereon or otherwise rigidly secured thereto and this sleeve is provided at its outer end with a narrow arresting flange $c'$ extending nearly all the way around the sleeve and between the ends of the said flange $c'$ is a clutch lug or projection $c^2$ of greater thickness than the flange $c'$, the said lug being preferably so located that a space or recess $c^3$ is provided on either side of the same between the lug and the adjacent end of the flange $c'$. Upon the sleeve $c$ is mounted the movable clutch member which in this instance is combined with a gear wheel $d$ which is free to rotate upon the sleeve $c$ and also to move endwise thereon and is provided with a clutch lug $d'$ and also with an annular groove $d^2$ to receive a yoke $g^2$ for moving the clutch member and the gear wheel lengthwise of the sleeve $c$ and the shaft $b$. It will be seen that when the clutch is thrown in the clutch lug $d'$ will be moved over into engagement with the flange $c'$ which will arrest it in position to engage the clutch lug $c^2$ and as soon as relative rotary movement is imparted to the said parts, the clutch lug $d'$ will be brought into engagement with the lug $c^2$ at which time it will be in position to enter one or other of the spaces $c^3$ and the clutch will be thrown further, to cause the lug $d'$ to enter the locking recess $c^3$ with which it is alined, thus locking the parts of the clutch together positively and preventing any relative rotary movement between them and also effectually preventing backlash.

In the present embodiment of my invention herein shown the motor is provided with a shaft $a$ carrying a gear wheel $a'$ which is secured thereon and located out of alinement with the gear wheel $d$ when in retracted position. The yoke $g^2$ which operates the clutch is attached to a piston $g'$ working in a pressure cylinder G which is connected by a pipe or passage $f'$ extending thereto from the discharge pipe $f$ of the pump cylinder F. The outlet pipe $f$ is adapted to be provided with a connecting pipe which may be used for inflating tires and other purposes. The presence of pressure in the cylinder G will obviously operate the piston $g'$ and move the clutch into operative position with an elastic pressure so that the operation previously described will take place. The piston $g'$ is in the present instance actuated whenever the connecting pipe from the discharge pipe $f$ is connected with the tire valve so as to open the valve in the tire. Immediately on the opening of the tire valve the compressed air already in the tire will expand through connecting pipe into the discharge pipe $f$ and thence through the pipe $f'$ to the pressure cylinder G, thus actuating the clutch and throwing the pump into operation. Obviously during the operation of the pump, the back pressure through the pipe $f'$ will hold the piston $g$ and the clutch in operative position. The parts can be restored to their normal positions by any suitable retracting means so that upon the relief of the back pressure in the pressure cylinder G the clutch will be moved to inoperative position. The space $c^3$ is preferably provided on each side of the lug $c^2$ so that the device can be used to lock the parts when running in either direction. Obviously, if the device were intended to be run in one direction only, only one of these spaces $c^3$ would be necessary.

In Fig. 6 a slight modification of the clutch is shown in which the shaft $b$ of the pump or driving member has an extended bearing in the form of a stationary sleeve $b'$ concentric therewith upon which is located a rotary and endwise movable part $d$ carrying the clutch lug $d'$. In this instance the shaft $b$ is provided with a collar secured thereto and having formed thereon the flange $c'$ and the clutch lug $c^2$ as shown in the other figures, and as previously described.

The operation of the device is exactly as hereinbefore set forth except that the part $d$ will rotate about the stationary sleeve $b'$ when the clutch members are in engagement instead of rotating with the rotary sleeve $c$ as in the other form. This form of clutch is admirably adapted for use in connecting the driving mechanism of a pump with a motor as herein shown and it may also be used for other purposes. The clutch also connects the two parts thereof always in the same relation, as will be obvious, and it can be conveniently used wherever it is desired to connect rotary parts so that they will always come into gear in the same relation to each other.

In the operation of my improved clutch it will be seen that when a tire, for example, is to be pumped, the tire valve will be connected with the outlet pipe $f$ of the pump in the usual manner so as to open the tire valve, the back pressure from the tire immediately extending back into the pump and through the by pass $f'$ to the cylinder G and actuating the piston therein, thereby moving the gear wheel $d$ carrying the clutch lug $d'$ longitudinally of its axis with a yielding or elastic force. The clutch lug $d'$ will be brought into engagement with the stop flange $c'$ as it would not under ordinary circumstances immediately enter the recess $c$ and as the gear wheel $d$ will be partially engaged with the gear wheel $a'$, thereby communicating motion to the gear wheel $d$ from the shaft $a$, and as the clutch lug $d'$ is rotated around in contact elastically with the flange $c'$, it will of necessity encounter the clutch lug $c^2$ and commence to impart movement to the pump shaft while at the same time the instant the clutch $d'$ being alined with the recess $c$, the elastic pressure of the fluid into the piston cylinder G forces the gear wheel $d$ and clutch lug $d'$ further toward the flange $c'$ and causes the lug $d'$ to engage the recess $c$, thereby positively locking the parts together and preventing relative movement in either direction, and thus obviating backlash which would otherwise be likely to take place, owing to the fact of the compressed fluid in the pump cylinder and weight of the piston, during the return stroke of the pump piston.

What I claim and desire to secure by Letters Patent is:—

1. The combination with a rotary shaft, of a concentric member loosely mounted rotatably and longitudinally, a second member connected with said shaft for rotation therewith, each of said members being provided with a clutch lug extending toward the other member, and one of said members being provided with an arresting shoulder adapted to be engaged by the clutch lug of the other member and having a locking recess to engage said clutch lug, and yielding means for moving the longitudinally movable member into operative position, whereby during the first portion of said longitudinal movement the arresting flange will arrest the stop lugs engaged by it until the two stop lugs are brought into operative contact, when the yielding actuating means will automatically impart a further movement to the longitudinally movable member to force its clutch lug into said recess and lock the parts against relative movement in either direction.

2. The combination with a main shaft, of a clutch member mounted concentrically thereof and provided with a projection extending parallel to the axis of the shaft, a coöperating clutch member provided with a face perpendicular to the axis of the shaft for engaging the end of said projection, a lug projecting from said face for engaging a lateral face of said projection and having also a recess adjacent to said lug for receiving said projection, one of said members being secured to said shaft and the other normally rotatable with respect thereto and one of said members being movable longitudinally of its axis into and out of engagement with the other, an actuating cylinder and piston, connections between said piston and said longitudinally movable member for moving it in a direction toward the other member, whereby said projection will be moved yieldingly into engagement with said face, said lug will be brought into and held in lateral engagement with said projection by the revolution of one of said members, and thereafter said projection will be forced automatically into said recess, by the actuating cylinder and piston.

3. The combination with a rotatable shaft, of a concentric sleeve surrounding the same, a rotatable and longitudinally movable concentric member loosely mounted on said sleeve, a clutch lug secured to said loosely mounted member, a co-acting clutch lug secured to said shaft, and an approximately annular arresting flange secured to said shaft provided with a recess adjacent to the last mentioned stop lug to receive the stop lug of said movable member.

4. The combination with a rotatable shaft, of a stationary sleeve surrounding the same, a rotatable and longitudinally movable member loosely mounted upon said sleeve concentrically with said shaft, and provided with a clutch lug, a part rigidly connected to said shaft for rotation therewith provided with a co-acting clutch lug and with an approximately annular arresting flange having a recess adjacent to the last mentioned clutch lug to receive a clutch lug of said movable member.

5. The combination with a rotatable shaft, of a clutch member loosely mounted concentrically therewith, a second clutch member secured to said shaft to rotate therewith, each of said clutch members being provided with a clutch lug, and one of said clutch members being provided with an arresting flange adapted to engage the clutch lug of the other member and hold it in position to laterally engage the other clutch lug, said flange being provided with a recess on each side of the adjacent clutch lug, whereby the clutch lug of the other member may be forced into one of said recesses or the other, without regard to the direction of rotation of said shaft.

In testimony whereof I affix my signature in the presence of two witnesses.

FRANK E. TEN EYCK.

Witnesses:
J. F. QUIGLEY,
T. LEE ROGERS.